United States Patent [19]

Uchino et al.

[11] Patent Number: 4,700,733
[45] Date of Patent: Oct. 20, 1987

[54] FLOW CONTROL VALVE

[75] Inventors: Kazuyoshi Uchino, Tsurugashima; Masaya Nikaido, Higashimatsuyama, both of Japan

[73] Assignee: Jidosha Kiki Co., Ltd., Tokyo, Japan

[21] Appl. No.: 776,556

[22] Filed: Sep. 16, 1985

[30] Foreign Application Priority Data

| Sep. 25, 1984 | [JP] | Japan | 59-199959 |
| Mar. 27, 1985 | [JP] | Japan | 60-63001 |
| Apr. 1, 1985 | [JP] | Japan | 60-68774 |
| Apr. 1, 1985 | [JP] | Japan | 60-68775 |
| Apr. 4, 1985 | [JP] | Japan | 60-71650 |
| Apr. 4, 1985 | [JP] | Japan | 60-71651 |

[51] Int. Cl.$^4$ .................. G05D 7/01; F16K 31/122
[52] U.S. Cl. ........................ 137/117; 137/504
[58] Field of Search ............ 137/504, 116, 118, 117; 138/43

[56] References Cited

U.S. PATENT DOCUMENTS

| 2,584,418 | 2/1952 | Branson | 137/504 |
| 2,859,762 | 11/1958 | Banker | 137/116 X |
| 2,865,397 | 10/1964 | Chenault. | |
| 3,058,719 | 10/1962 | Beebee | 251/284 |
| 3,130,747 | 4/1964 | Benaway | 138/43 X |
| 3,156,262 | 11/1964 | Attebo | 137/504 X |
| 3,254,667 | 7/1964 | McGuire et al. . | |
| 3,939,859 | 2/1976 | Ueda et al. | 137/118 |
| 4,243,064 | 1/1981 | Nolte | 137/117 |
| 4,302,937 | 12/1981 | Aubert | 137/116 X |
| 4,343,324 | 12/1980 | Ohe et al. . | |
| 4,361,166 | 11/1982 | Honaga et al. | 137/117 |
| 4,442,857 | 4/1984 | Ohe et al. | 137/117 |

FOREIGN PATENT DOCUMENTS

| 997250 | 9/1976 | Canada | 137/504 |
| 146472 | 11/1981 | Japan . | |
| 57-4470 | 11/1982 | Japan . | |

Primary Examiner—Martin P. Schwadron
Assistant Examiner—Stephen M. Hepperle
Attorney, Agent, or Firm—Flynn, Thiel, Boutell & Tanis

[57] ABSTRACT

A flow control valve which exhibits a drooping response, namely, having a response which causes the flow rate supplied to a hydraulic instrument to be reduced as the discharge flow from a pump increases is disclosed. A spool valve is received in a bore, in which a union is disposed and secured. An orifice is formed in the union, and a sleeve is fitted around the union. A restriction which limits the passage of hydraulic fluid therethrough is formed on the external surface of the sleeve. A pressure differential between the upstream and the downstream side of the restriction is effective to cause a sliding movement of the sleeve to thereby reduce the area of the orifice, thus gradually decreasing the flow rate supplied to the hydraulic instrument.

13 Claims, 12 Drawing Figures

FLOW CONTROL VALVE

BACKGROUND OF THE INVENTION

The invention relates to a flow control valve, and in particular, to a flow control valve having a drooping response for the flow rate, namely, the response in which the flow rate supplied to a hydraulic instrument decreases with an increase in the discharge flow rate from a pump.

A flow control valve which exhibits such response is generally used in a power steering apparatus for vehicles and are useful in providing the stability to the vehicle when running at high speeds and in reducing the horsepower dissipated. An apparatus of this kind is disclosed, for example, in Japanese Laid-Open Patent Applications No. 104,186/1981 and No. 4,469/1982 in which an orifice is defined in a supply passage which feeds hydraulic fluid discharged from a pump to a hydraulic instrument, with a pressure differential across the orifice being effective to open a spool valve to return part of the hydraulic fluid, and in which a restriction is defined in the supply passage so that a control spool which is responsive to a pressure differential across the restriction operates to reduce the area of the orifice.

In an arrangement in which a pressure differential across the restriction is utilized to control the reduction in the area of the orifice, such pressure differential acts as an internal pressure loss within the pump, thus militating against the reduction in the horsepower dissipated as the flow rate decreases. Accordingly, a proposal is made which prevents the pressure differential across the restriction from increasing beyond a value required (see Japanese Laid-Open Patent Applications No. 146,472/1981 and No. 4,470/1982).

However, the flow control valves described above employ a complex construction and an increased number of parts, which must be machined to a high precision. In addition, difficulty is experienced in turning operating response.

SUMMARY OF THE INVENTION

Therefore, it is an object of the invention to provide a flow control valve which enables a drooping response to be obtained with a very simple arrangement. Such object is accomplished by fixedly mounting a trunk union in an opening of a bore which receives a spool valve therein. An orifice which is used to open the spool valve in accordance with a pressure differential is defined in the union, and a sleeve is fitted around the union, with a restriction defined on the external surface of the sleeve to restrict the passage of hydraulic fluid. A pressure differential between the upstream and the downstream side of the restriction causes a sliding movement of the sleeve, thus controlling a reduction in the area of the orifice.

It is another object of the invention to provide a flow control valve in which an increase of a pressure differential across the restriction beyond a required value is prevented.

Other objects and advantages of the invention will become apparent from the following description with reference to the drawings.

DESCRIPTION OF EMBODIMENTS

Figure 1:
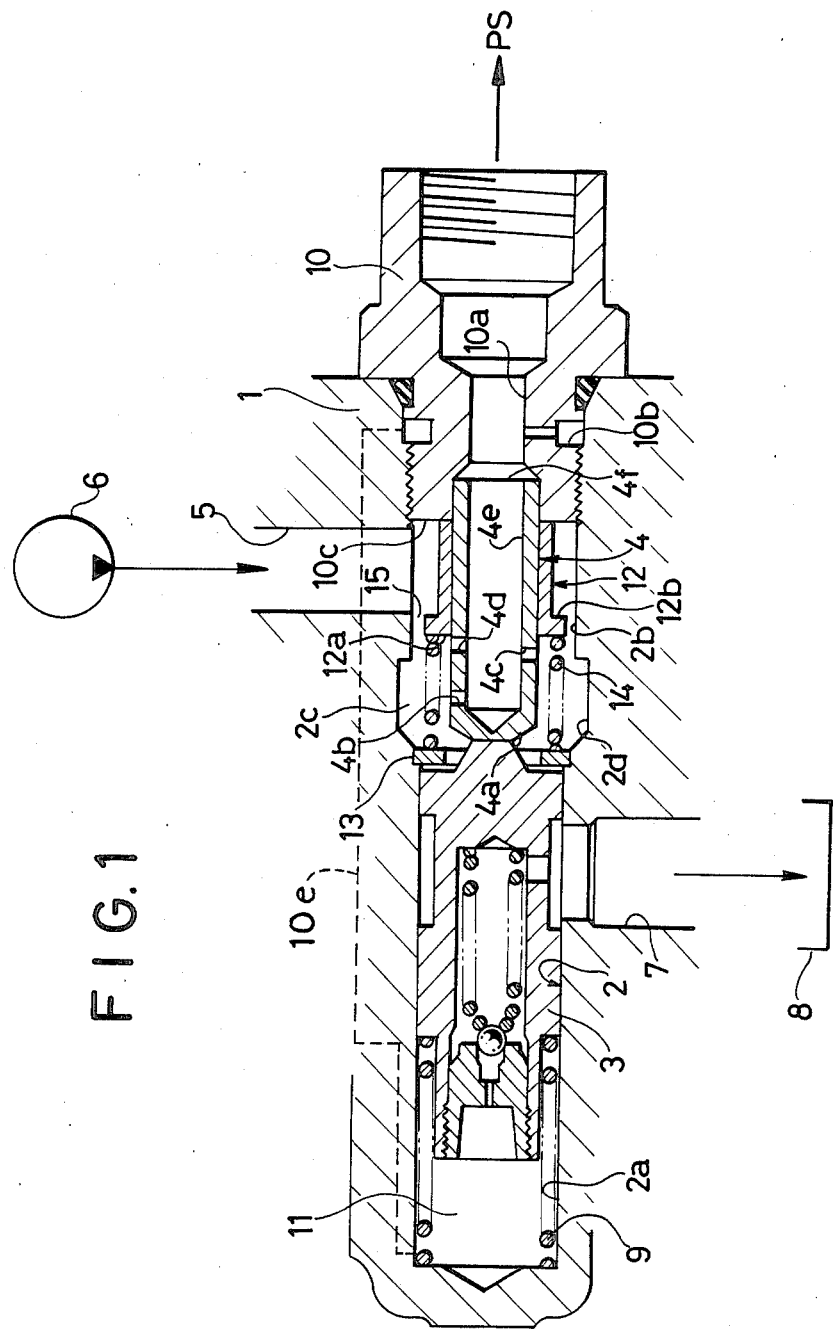
FIG. 1 is a longitudinal section of a flow control valve according to one embodiment of the invention.

Referring to FIG. 1, there is shown a flow control valve according to one embodiment of the invention. A pump housing 1 is formed with a bore 2 for receiving a spool valve therein, the bore having an increased diameter toward its opening. A spool valve 3 is received in a portion 2a of the bore 2 having a reduced diameter. A portion 2b of the bore which has an increased diameter receives a trunk union 4 having one end which is a press fit in an axial bore 10a of a connector 10. The union 4 is secured within the bore 2 by threadably engaging the connector 10 with the housing 1. The bore portion 2b communicates with a pump 6 through a supply path 5 while the bore portion 2a communicates with a tank 8 through a return path 7. The spool valve 3 disposed within the bore portion 2a is urged by a spring 9 into abutment against the end face of the union 4 where it remains at rest, interruping the communication between the supply path 5 and the return path 7.

At its end which is fitted into the connector 10, the union 4 is open while its end located adjacent to the spool valve 3 is closed, and thus is in the form of a trunk having a bottom. Adjacent such closed end 4a, the trunk union 4 is formed with an opening 4b which maintains a communication between the interior and the exterior thereof. In addition, a pair of orifices 4c, 4d are defined in the union at different axial positions which are offset from the opening 4b in a direction toward the center of the union. In this manner, the supply path 5 communicates with an internal passage 4e of the union 4 through a chamber 2c defined within the bore portion 2b, the both orifices 4c and 4d and the opening 4b. The internal passage 4e is connected to a power steering apparatus (P.S.) through an opening 4f formed in the union 4 and the axial bore 10a of the connector 10. The internal passage 4e also communicates with a chamber 11 in which the spring 9 is disposed, through a radial passage 10b formed in the connector 10 and a communication path, 10e which is formed in the housing 1. Accordingly, when the flow rate of hydraulic oil which is discharged from the pump 6 exceeds a given value, the pressure differential across the opening 4b and the orifices 4c, 4d acts on the opposite end surfaces of the spool valve 3 to move it to the left, as viewed in FIG. 1, when it overcomes the spring 9. In this manner, part of the hydraulic oil supplied from the pump 6 is returned to the tank 8.

A cylindrical sleeve 12 having a flange 12b is slidably fitted around the union 4. The sleeve 12 is urged by a spring 14 toward the connector 10 into abutment against the end face 10c of the connector 10 where it remains at rest, the spring 14 being disposed between a retainer ring 13 fitted around a step between the bore portions 2a and 2b and the end face 12a of the sleeve 12.

A gap 15 is formed between the external peripheral surface of the flange 12b of the sleeve 12 and the internal peripheral surface which defines the bore 2, thus defining a restriction which limits the flow rate of hydraulic oil supplied from the pump 6. Accordingly, when the flow rate of the oil supplied from the pump 6 exceeds a given value, a pressure differential across the restriction 15 is effective to move the sleeve 12 toward the spool valve 3 or to the left, as viewed in FIG. 1, against the resilience of the spring 14.

The pair of orifices 4c, 4d are positioned so that they are open when the sleeve 12 is maintained in abutment against the end face of the connector 10 and are closed by the sleeve 12 when the latter has moved to the left. A section of the bore portion 2b having an increased diameter which is located toward the bore portion 2a or which surrounds the end 4a of the union 4 located adjacent to the spool valve 3 is formed with an increased diameter 2d.

In operation, in a range of low speed rotation of the pump 6 which is driven by an engine mounted on a vehicle, or in a range of low flow rate, the spring 9 urges the spool valve 3 into abutment against the union 4, thus interrupting the communication between the supply path 5 and the return path 7. The spring 14 also urges the sleeve 12 into abutment against the end face 10c of the connector 10 where it remains at rest. Accordingly, the entire amount of hydraulic oil discharged from the pump 6 is fed to a power steering apparatus.

As the number of revolutions of the pump increases gradually, the discharge increases, whereby the pressure differential across the opening 4b and the orifices 4c, 4d causes the spool valve 3 to be driven to the left, whereupon the return path 7 communicates with the supply path 5 to return an excess amount of flow rate, thus maintaining a substantially constant flow rate which is supplied to the power steering apparatus (P.S.).

As the number of revolutions of the pump further increases, the pressure differential across the restriction 15 increases significantly, which overcomes the resilience of the spring 14 to drive the sleeve 12 to the left. As a consequence, the sleeve 12 initially acts to reduce the area of the first orifice 4d and then acts to reduce the area of the second orifice 4c in a gradual manner, thus producing a gradual reduction in the amount of oil supplied to the power steering apparatus. In addition, the pressure differential across the orifices 4c, 4d increases to move the spool valve 3 further to the left, thus increasing the amount of oil which is returned. Such reduction in the amount of oil supplied to the power steering apparatus enhances the high speed stability of the vehicle and also contributes to reducing the horsepower dissipated during the high speed running.

As the number of revolutions of the pump increases to an additional extent and the discharge from the pump 6 increases in a corresponding manner, the sleeve 12 is driven further to the left, but when the flange 12b moves into the region of the increased diameter portion 2d, the gap 15 is suddenly enlarged, thus suppressing a further increase in the pressure differential between the upstream and the downstream side of the restriction 15. In this manner, an advantage is gained that the horsepower dissipated is reduced without causing an additional load on the pump 6.

It will be noted that after the sleeve 12 has overlapped and closed the both orifices 4d, 4c as a result of its movement to the left, the communication opening 4b which is located adjacent to the free end of the union remains open, thus assuring a minimum amount of oil flow required of the power steering apparatus.

It is to be noted that any variation which occurs in the pressure of the hydraulic instrument (power steering apparatus) when the sleeve 12 has moved to the left results in no change in the flow rate which passes through the restriction 15 and hence no change in the pressure differential thereacross, and hence it causes no movement of the sleeve 12, whereby the flow rate to the hydraulic instrument (power steering apparatus) remains unchanged.

As described, in the present embodiment, the restriction 15 is defined between the external peripheral surface of the sleeve 12 which is fitted around the union 4 and the internal peripheral surface which defines the bore 2 of the housing 1, and the pressure differential across the restriction is utilized to move the sleeve 12. In this manner, a dual function is achieved in that it operates at one time as a variable throttle valve which gradually reduces the area of the orifices 4c, 4d and operates at other times as a relief valve which prevents the pressure differential across the restriction 15 from increasing beyond a required value. Thus, there is obtained a flow control valve which exhibits a high reliability with a simple construction and which can be manufactured at a reduced cost, without requiring an increased number of parts as in the prior art. It is not necessary that a plurality of orifices be provided in order to achieve the advantage of the invention. However, the provision of a plurality of orifices 4c, 4d at axially offset positions permits an increased stroke to be chosen for the sleeve 12. This avoids any influence of design and machining errors such as a spring constant of the spring 14, and enables the construction of a high precision unit. Orifices having different diameters may be used in combination to provide a desired change in the operating response.

Figure 2:
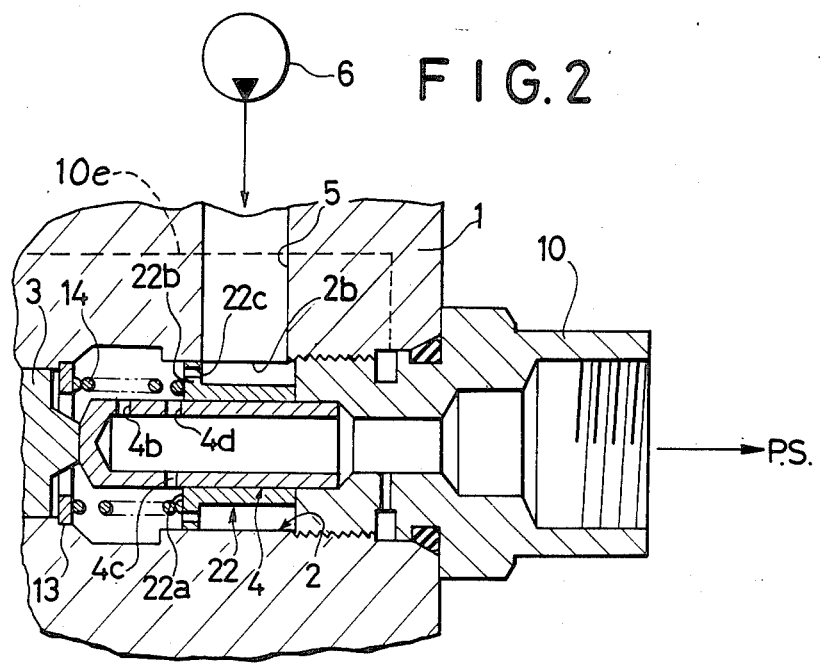
FIG. 2 and 3 are longitudinal sections of other embodiments, illustrating essential parts thereof.
Figure 3:
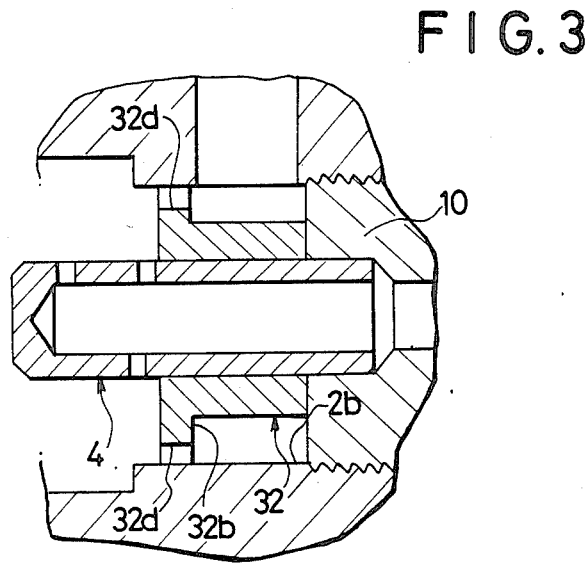
Figure 4:
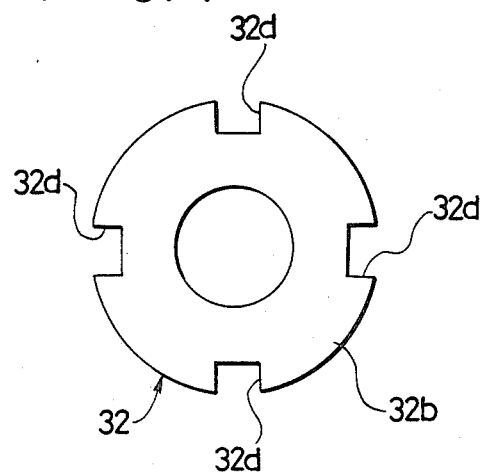
FIG. 4 is a front view of a sleeve used in the embodiment of FIG. 3.
Figure 5:
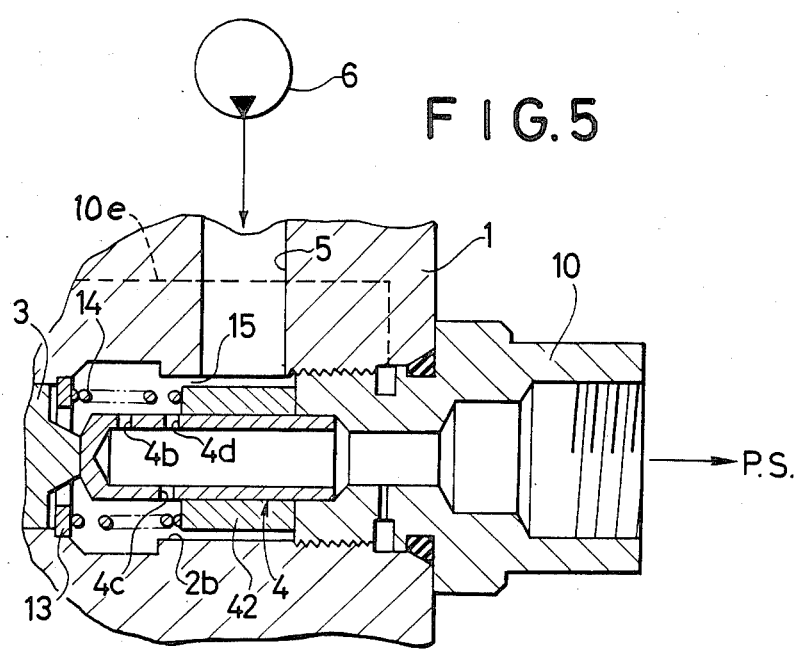
FIGS. 5 to 12 are longitudinal sections, illustrating essential parts of other embodiments of the invention.

FIGS. 2 to 5 show modifications which utilize sleeves of different configurations. In FIG. 2, there is shown a sleeve 22 having a flange 22b which is enlarged externally, with its outer diameter substantially coinciding with the internal diameter of the bore portion 2b. Hence, when the sleeve 12 is acted upon, the internal surface of the sleeve 12 moves along the external surface of the union 4 while the external surface of the flange 22b slides along the internal surface of the bore portion 2b. A plurality of holes 22c extend through the flange 22b, each of which defines a restriction which is effective to restrict the flow rate of hydraulic oil supplied from the oil pump 6. In FIG. 3, there is shown a sleeve 32 having a flange 32b of an outer diameter which substantially coincides with the internal diameter of the bore portion 2b. The flange 32b is peripherally formed with four notches 32d (see FIG. 4) which are equi-distantly spaced apart circumferentially, the notches 32d also defining restriction. In FIG. 5, there is shown a sleeve 42 which is formed as a cylinder having an increased wall thickness. A gap 15 is defined between the external peripheral surface of the sleeve 42 and the internal surface of the bore 2, and provides a restriction which restrict the flow rate of hydraulic oil supplied from the oil pump 6.

It will be apparent that these modifications shown in FIGS. 2 to 5 function in the similar manner to achieve similar effects as the embodiment shown in FIG. 1. It will also be appreciated that the location, the configuration and the number of the holes 22c or notches 32d are not limited to those shown, but may be freely chosen.

Figure 6:
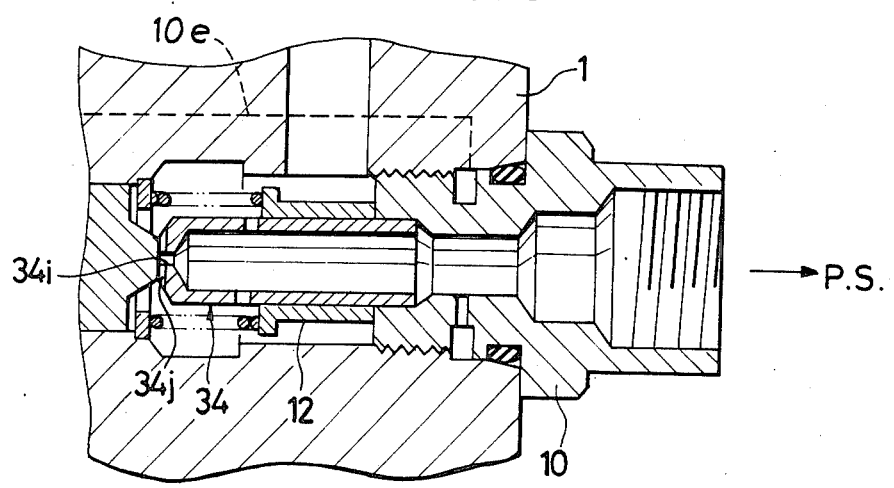
Figure 7:
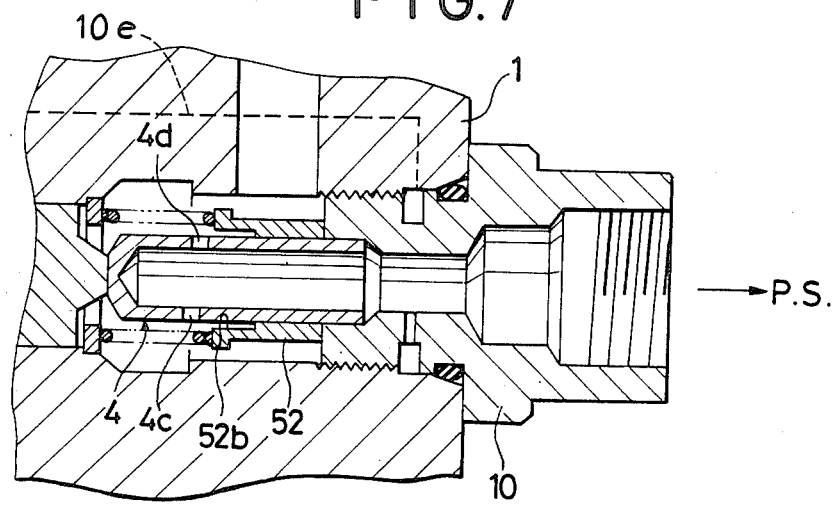
Figure 8:
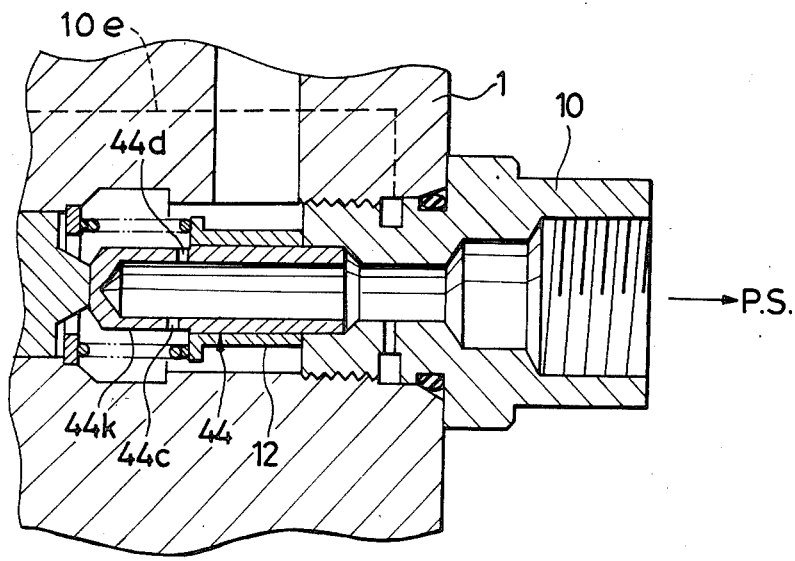

Means which secures the minimum flow rate required by the power steering apparatus when the orifice or orifices are closed by the sleeve is not limited to the radial opening 4b formed in the union 4 in the manner mentioned above, but may comprise an axial passage 34i and a diametrical groove 34j formed in the front end face of a union 34 as shown in FIG. 6. Alternatively, as illustrated in FIG. 7, a portion of the internal surface of a sleeve 52 may be formed to have a greater inner diameter (52b) than the remainder. Conversely, orifices 44c, 44d may be formed in a section 44k of a union 44 which has an outer diameter which is less than the diameter of the remainder of the union along which the sleeve 12 slides, as illustrated in FIG. 8. In these manners, a slight gap may be left between the sleeves 52, 12 on one hand and the unions 4, 44 on the other hand when the sleeves 52, 12 overlap orifices 4c, 4d or 44c, 44d.

In these embodiments, the unions 4, 34 and 44 are fixedly connected to the housing 1 through the connector 10, but it should be understood that each of these unions and the connector may be integrally constructed. However, the provision of a cylindrical union which is separate from the connector improves the machinability of the union and also permits a thermal treatment of the single union member so as to increase the abrasion resistance of its portion which is subject to a sliding movement relative to the sleeve. In addition, a tuning of various responses are possible by selecting a particular one of the unions. In addition, while each of the unions 4, 34 and 44 are disposed in coaxial relationship with the spool valve 3, it is also possible to choose a orthogonal or parallel disposition.

The disposition of the orifices is not limited to the arrangements shown. For example, three or more orifices may be provided. In addition, they are not limited to circular configuration, but may be formed in a variety of configurations. In addition, it is also possible to provide a plurality of orifices having different sizes, and their axial and circumferential locations can be selected in a variety of ways. By choosing the number and configurations of such orifices, a desired response can be obtained.

Figure 9:
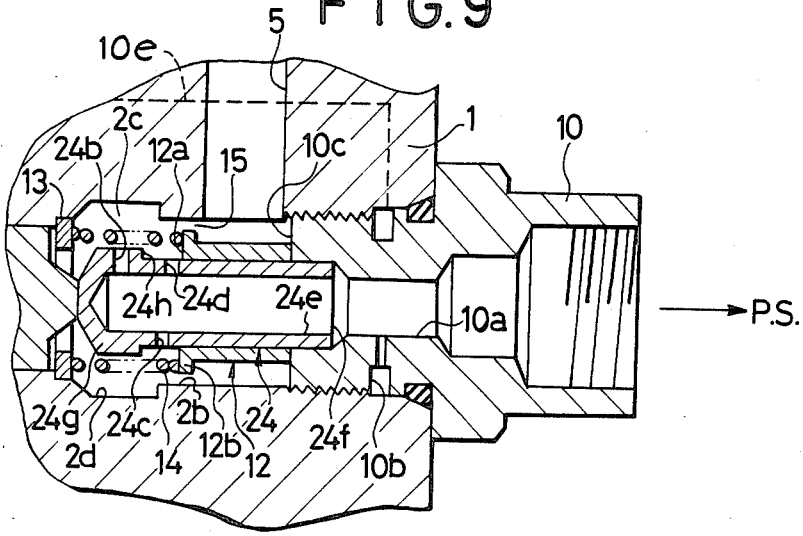

FIG. 9 shows a further embodiment of the invention which includes a stop mechanism for constraining the sleeve 12 from moving beyond a necessary extent. Except for the configuration of a union 24, the present embodiment is constructed in an identical manner with the embodiment shown in FIG. 1, and therefore the remainder will not be specifically described. Considering the union 24, a front end portion thereof in which a communication hole 24b is formed has its outer diameter increased to define a trunk section 24g. Accordingly, as the sleeve 12 moves to close orifices 24d, 24c sequentially, the end face 12a of the sleeve abuts against a step 24h of the sleeve section 24g where its further movement is stopped. The provision of such stop mechansim avoids the likelihood of an excessively large displacement of the sleeve 12 which may result from an excessively high pressure differential across the restriction 15 as when the temperature is low or the hydraulic oil exhibits a high viscosity, and eliminates any problem which may be related to the strength of the spring 14.

Figure 10:
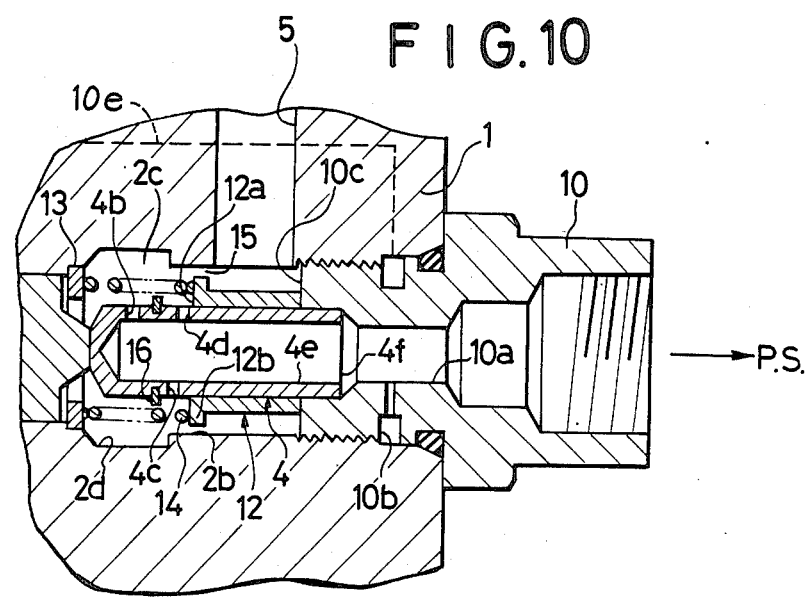

In place of forming the sleeve section 24g of an increased diameter, a stop ring 16 may be fitted around the union at a location intermediate the communication hole 4b and the adjacent orifice 4c, as illustrated in FIG. 10, thus allowing the sleeve to abut against the stop ring.

Figure 11:
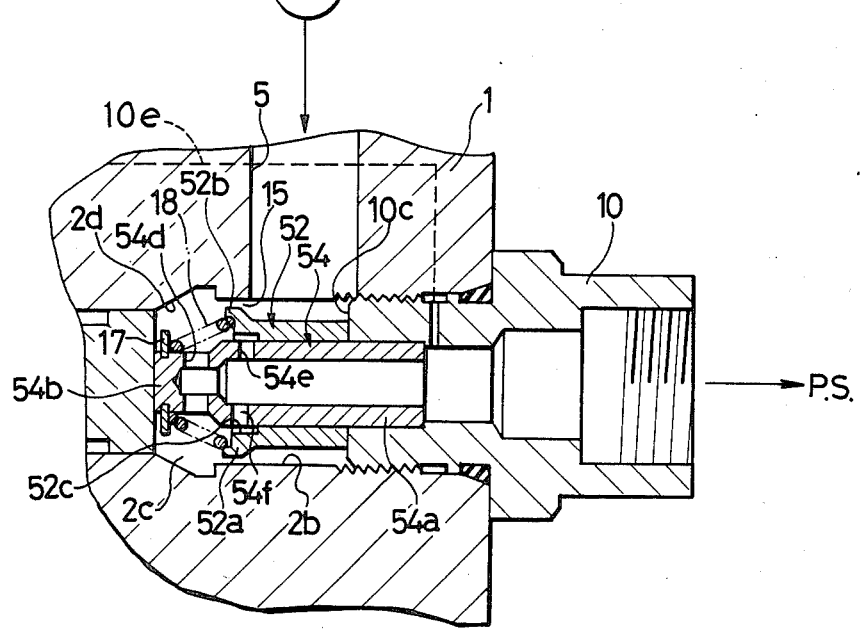

FIG. 11 show still another embodiment of the invention. In this embodiment, a union 54 has a trunk portion 54a of an increased diameter which is fitted into the connector 10 and another trunk portion 54b which is adapted to abut against the spool valve 3. The union portion 54b is formed with a radial passage 54d while the union portion 54a is formed with a pair of orifices 54e, 54f at axially offset positions, toward the portion 54b.

On the other hand, a sleeve 52 has a flange 52a which is circumferentially formed with an annular fold 52b, and is urged against the connector 10 by a conical spring 18 which is disposed between the annular fold 52b and a retainer 17 which is fitted around the union portion 54b, whereby it abuts against the end face 10c of the connector 10 where it remains at rest. In a region of the flange 52a, the internal peripheral surface of the sleeve 52 is formed with an annular groove 52c, which prevents a direct contact between the internal surface of the sleeve 52 and the external peripheral surface of the union 54. The both orifices 54e, 54f are positioned so as to be located inwardly of the annular groove 52c when the sleeve 12 remains stationary in abutment against the connector 10.

Again, the present embodiment provides a drooping response with a greatly simplified construction, in the similar manner as the embodiments described above. In addition, the union 54, the sleeve 52 and the conical spring 18 are assembled together as an integral unit, thus eliminating any error involved with an assembling operation to provide a flow control valve which exhibits a high reliability. Since the spring 18 is assembled on the free end of the union 54, the hydraulic oil which flows past between the adjacent turns of the spring 18 is limited to a regulating flow which is fed to the power steering apparatus. Accordingly, the pressure loss which may occur as the spring 18 is flexed by the movement of the sleeve 52 is minimized, reducing any influence upon the operating response. Accordingly, the axial length of the spring 18 may be reduced, thereby providing a compact assembly.

Figure 12:
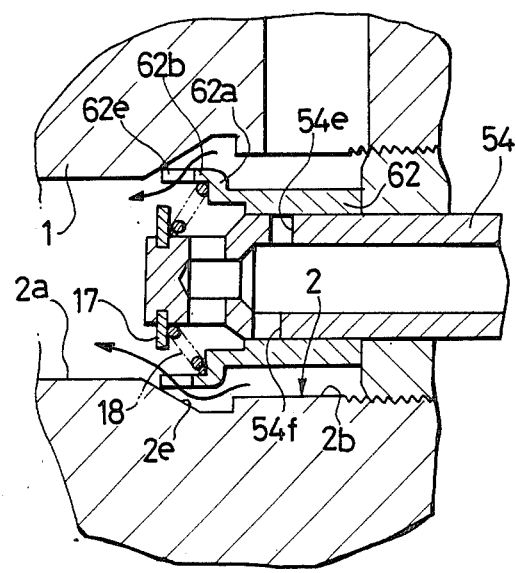

FIG. 12 shows a still further embodiment of the invention which incorporates a stop mechanism of a different construction. This embodiment includes a sleeve 62 which is similar to that shown in FIG. 11. The sleeve 62 has a flange 62a, which is in turn formed with an annular fold 62b on the free end thereof, the fold 62b extending in a direction toward a tapered surface 2e disposed between the bore portions 2b and 2a of an increased and a reduced diameter. The annular fold 62b has a length which is sufficient to allow its abutment against the tapered surface 2e to interrupt the movement of the sleeve 62 after the sleeve 62 has sequentially closed both orifices 54e, 54f through a sliding movement thereof. As shown, notches 62e are formed in the upper and the lower portion of the annular fold 62b to secure a path for the flow of hydraulic oil when the sleeve 62 abuts against the tapered surface 2e. In place of forming such notches in the annular fold 62b, the path for the hydraulic oil can also be secured by any other means such as providing projections to define a path therebetween or providing a hole or holes. In addition, the surface against which the annular fold 62b abuts is not limited to an inclined surface, but may be a surface which extends perpendicular to the axis. This embodiment operates in the similar manner to achieve similar effects as those embodiments described above, and the provision of the stop mechanism eliminates any problem related to the strength.

It is possible to apply the various configurations of the union and the sleeve, specifically described in connection with individual embodiments, in any combination unless no conflict occurs. By way of example, a sleeve of configurations shown in FIGS. 2 to 5 may be used in combination with a stop mechanism as illustrated in FIGS. 9 and 10, or may be used in combination with means which secure a path for the flow rate fed to the power steering apparatus as illustrated in FIGS. 6 to 8.

As many apparently widely different embodiments of this invention may be made without departing from the spirit and scope thereof, it is to be understood that the invention is not limited to the specific embodiments thereof except as defined in the appended claims.

We claim:

1. A flow control valve having first and second valve means, means defining a supply path between a hydraulic fluid discharged from a sump via a pump and a hydraulic instrument, an orific formed in said supply path, a pressure differential across said orifice effecting an opening of said first valve means to return part of the hydraulic fluid to said sump, comprising a trunk union disposed in a bore defined in a housing and secured to said housing, said orifice being formed in said union, said second valve means including a sleeve fitted around said union and having fluid restricting means on the external surface thereof for restricting the passage of hydraulic fluid past said fluid restricting means, a pressure differential between the upstream and the downstream side of said restricting means being effective to cause a sliding movement of said sleeve to reduce the area of said orifice, said bore including a portion having an increased diameter to facilitate an increased flow past said fluid restricting means as said sleeve moves into said bore portion as a result of said pressure differential.

2. A flow control valve according to claim 1 in which said restricting means is defined by a flange on said sleeve.

3. A flow control valve according to claim 2 in which said restricting means is defined between the outer external surface of said flange and an internal surface of a bore in said housing.

4. A flow control valve according to claim 2 in which an external peripheral surface of said flange is in sliding contact with an internal surface of said bore in said housing.

5. A flow control valve according to claim 4 in which said restricting means is defined by a hole extending through said flange.

6. A flow control valve according to claim 4 in which said restricting means is defined by a notch formed in the periphery of said flange.

7. A flow control valve according to claim 1 in which said sleeve is cylindrical in configuration and has a portion with increased wall thickness, and in which a gap between an external peripheral surface of said sleeve and an internal surface of said bore in said housing defines said restricting means.

8. A flow control valve according to claim 1 in which a plurality of orifices are formed in said union.

9. A flow control valve according to claim 8 in which said plurality of orifices are disposed at positions which are offset from each other in an axial direction of said union.

10. A flow control valve according to claim 1, further including stop means for limiting the sliding movement of said sleeve.

11. A flow control valve according to claim 10 in which said stop means is formed by a projection on an external surface of said union.

12. A flow control valve according to claim 10 in which said stop means comprises a ring fitted around an external surface of said union.

13. A flow control valve according to claim 1 in which said sleeve is urged to a non-area reducing position by a spring which is disposed between a retainer mounted on one end of said union and an end of said sleeve.

* * * * *